United States Patent

Kazmark, Jr. et al.

[11] Patent Number: 5,732,443
[45] Date of Patent: Mar. 31, 1998

[54] HANDLE ASSEMBLY WITH AN ACTUATOR AND RELEASE APPARATUS

[75] Inventors: Eugene A. Kazmark, Jr., Joliet; Thaddeus Strozak, New Lenox; Tadeusz Rutkowski, Downers Grove, all of Ill.

[73] Assignee: Remin Laboratories, Inc., Joliet, Ill.

[21] Appl. No.: 656,447

[22] Filed: May 31, 1996

Related U.S. Application Data

[63] Continuation-in-part of Ser. No. 275,631, Jul. 15, 1994, Pat. No. 5,522,615.
[51] Int. Cl.⁶ .................................................. B25G 1/04
[52] U.S. Cl. ........................ 16/115; 190/18 A; 280/655
[58] Field of Search .......................... 16/115; 190/18 A; 280/655, 655.1, 37, 47.315, 47.317, 47.36, 47.26

[56] References Cited

U.S. PATENT DOCUMENTS

| | | | |
|---|---|---|---|
| 569,602 | 11/1896 | Lin | 16/115 |
| 4,154,545 | 5/1979 | Pinto et al. | 403/104 |
| 5,291,976 | 3/1994 | Ku | 190/18 A |
| 5,308,103 | 5/1994 | Chin-Shung | 280/655 |
| 5,367,743 | 11/1994 | Chang | 16/115 |
| 5,371,923 | 12/1994 | Chang | 16/115 |
| 5,553,350 | 9/1996 | Chang | 16/115 |

FOREIGN PATENT DOCUMENTS

| | | |
|---|---|---|
| 2 404 754 | 4/1979 | France. |
| 2 241 995 | 9/1991 | United Kingdom. |

*Primary Examiner*—Chuck Y. Mah
*Attorney, Agent, or Firm*—Tilton, Fallon, Lungmus & Chestnut

[57] ABSTRACT

A handle assembly for carts and wheeled luggage includes a pair of tube assemblies disposed in substantially parallel relation and connected by a handle member. The tube assemblies carry locks that cooperate with the tubes to releasably lock the tube assemblies in an extended or a retracted position.

15 Claims, 4 Drawing Sheets

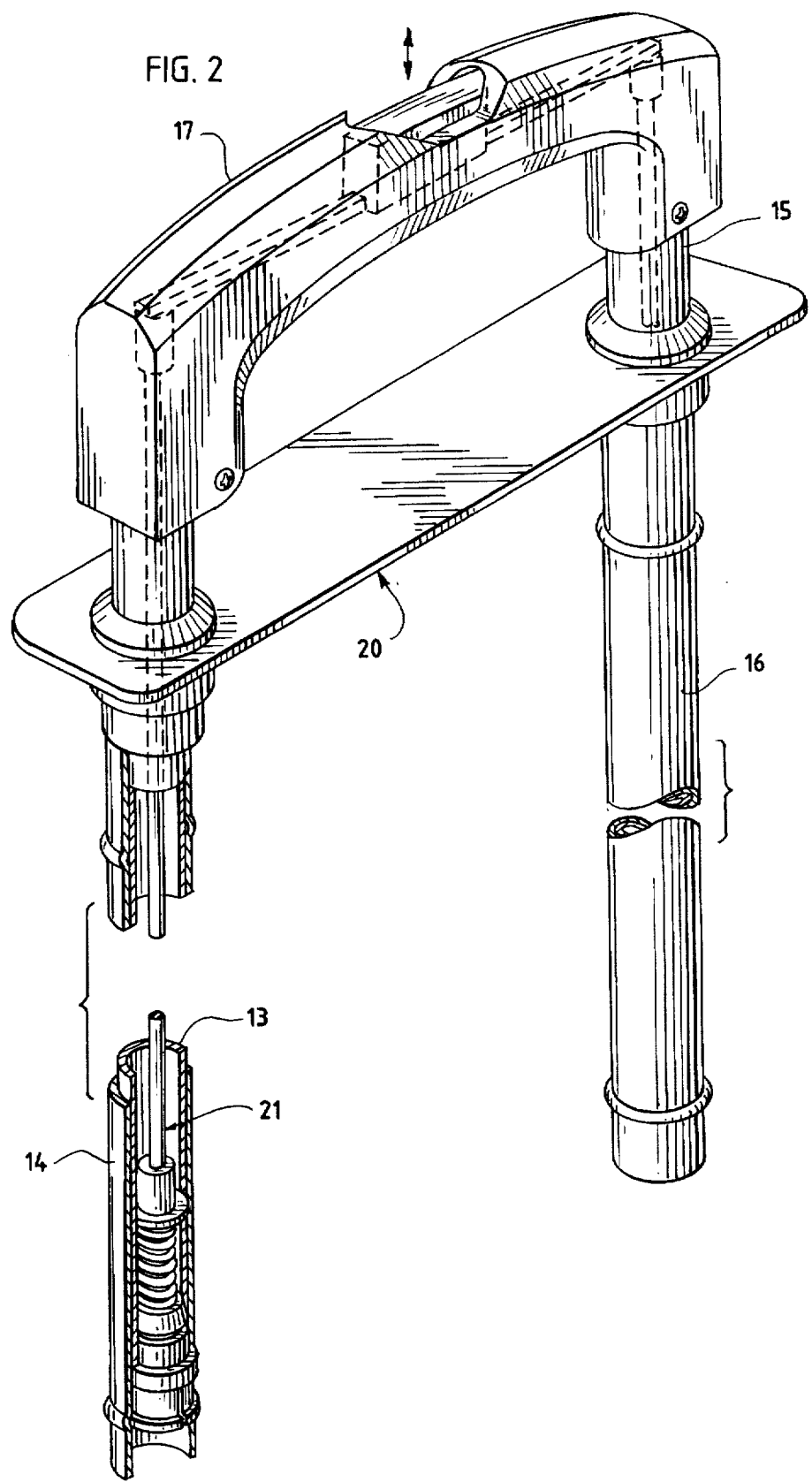

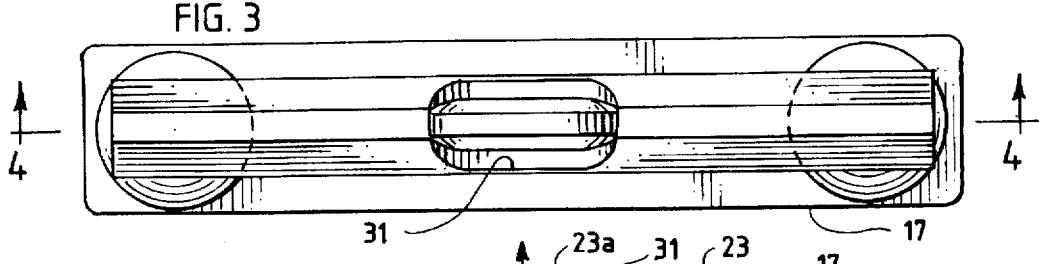
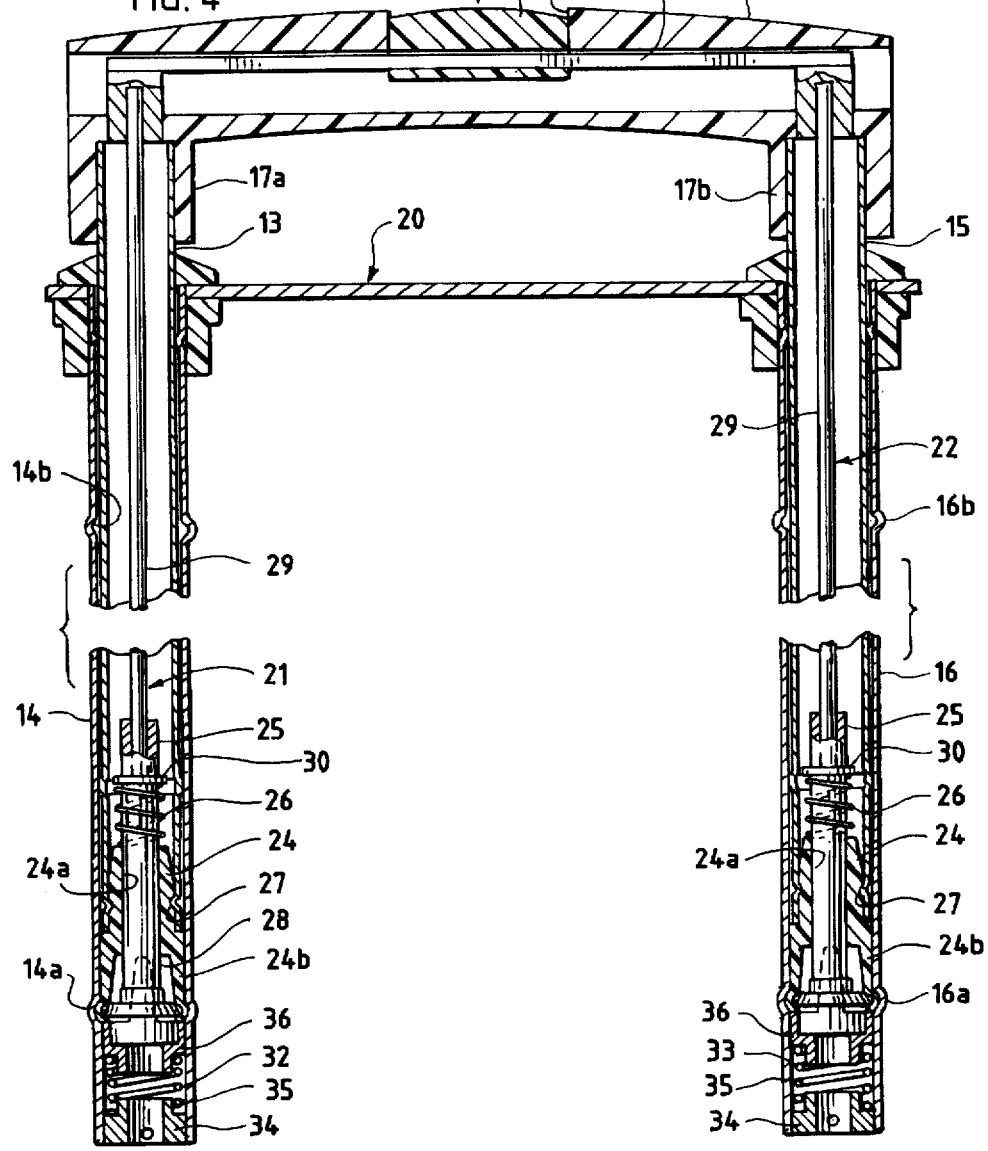
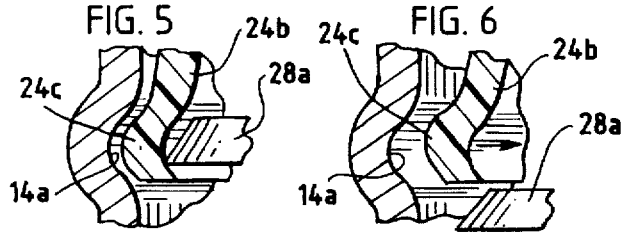
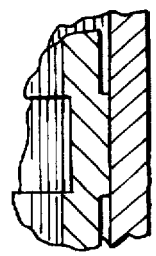

HANDLE ASSEMBLY WITH AN ACTUATOR AND RELEASE APPARATUS

This application is a continuation-in-part of application Ser. No. 08/275,631, filed Jul. 15, 1994 for "Cart And Luggage Handle Assembly With An Actuator And Release Apparatus," now U.S. Pat. No. 5,522,615.

BACKGROUND OF THE INVENTION

1. Field of the Invention

The present invention relates to a handle assembly for carts or wheeled luggage and more particularly to a handle assembly which includes a pair of telescoping tube assemblies that carry at least one locking assembly for releasably securing the tubes of the tube assemblies in an extended or retracted position.

2. Description of the Prior Art

The prior art includes a wide variety of carts and wheeled luggage with telescoping and collapsible handle assemblies. For example, Cheng U.S. Pat. No. 5,127,664 discloses a trolley with telescopic tubes, Kazmark, Sr. U.S. Pat. No. 3,998,476 discloses a portable luggage carrier with a telescoping handle, and Carrigan, Jr. U.S. Pat. No. 5,167,306 discloses wheeled luggage with a handle assembly. Some of the handle assemblies in these carts and luggage include means for stopping the separation of telescoping tubes while others include means for locking the handle assemblies in more than one position, typically a retracted and an extended position.

The carrier described in Kazmark, Sr. U.S. Pat. No. 3,998,476 includes means for locking the handle assemblies. It has a handle assembly comprising a pair of collapsible and telescoping tube assemblies. The lower ends of the intermediate and upper tubes carry lock buttons which extend through openings in the upper ends of the lower and intermediate tubes to releasably lock the tubes in an extended position. A pair of upper and lower release bars which extend between the tube assemblies adjacent the upper ends of the lower tubes release the lock buttons.

Some prior art devices do not lend themselves to easy application in wheeled luggage. Others are complex arrangements with a multitude of components. The complexities of those prior art devices make them susceptible to malfunctions such as binding or jamming. Still other prior devices require actuators disposed outwardly of telescoping tubes to lock and unlock the tubes.

The handle assembly of the present invention includes at least one locking assembly disposed in the handle assembly tubing and cooperating with the tubing to allow a user to place and lock the handle assembly in an extended or retracted position. The handle assembly is a simple construction which minimizes the expense of manufacture and provides quick and effective operation.

SUMMARY OF THE INVENTION

In accordance with one embodiment of the present invention, a handle assembly for wheeled carts or luggage includes at least one tube assembly with first and second tubes. The first tube extends into the second tube in telescoping relation with the second tube. Locking means secured to the first tube lock the first tube in a predetermined position and prevent relative sliding movement between the first tube and the second tube.

The locking means includes a latching member and a plunger member for displacing the latching member laterally of the first and second tubes which contain the locking means. The second tube includes receiving means, e.g., a groove or an opening formed into the second tube, for cooperating with the latching member to lock the first tube relative to the second tube.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 2 is a partial perspective view of the handle assembly of the present invention with a portion of the tubing of one tube assembly cut away to show the locking means of the assembly;

FIG. 3 is a plan view of the handle assembly shown in FIGS. 1 and 2;

FIG. 4 is a sectional view taken along line 4—4 in FIG. 3;

FIG. 5 is an enlarged sectional view, showing the locking means in a locked position;

FIG. 6 is the sectional view of FIG. 5, showing the locking means in an unlocked position;

FIG. 7 is an enlarged sectional view, showing a stop portion in the tubing;

While the following disclosure describes the invention in connection with one embodiment, one should understand that the invention is not limited to this embodiment. Furthermore, one should understand that the drawings are not to scale and that graphic symbols, diagrammatic representations, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Figure 1:
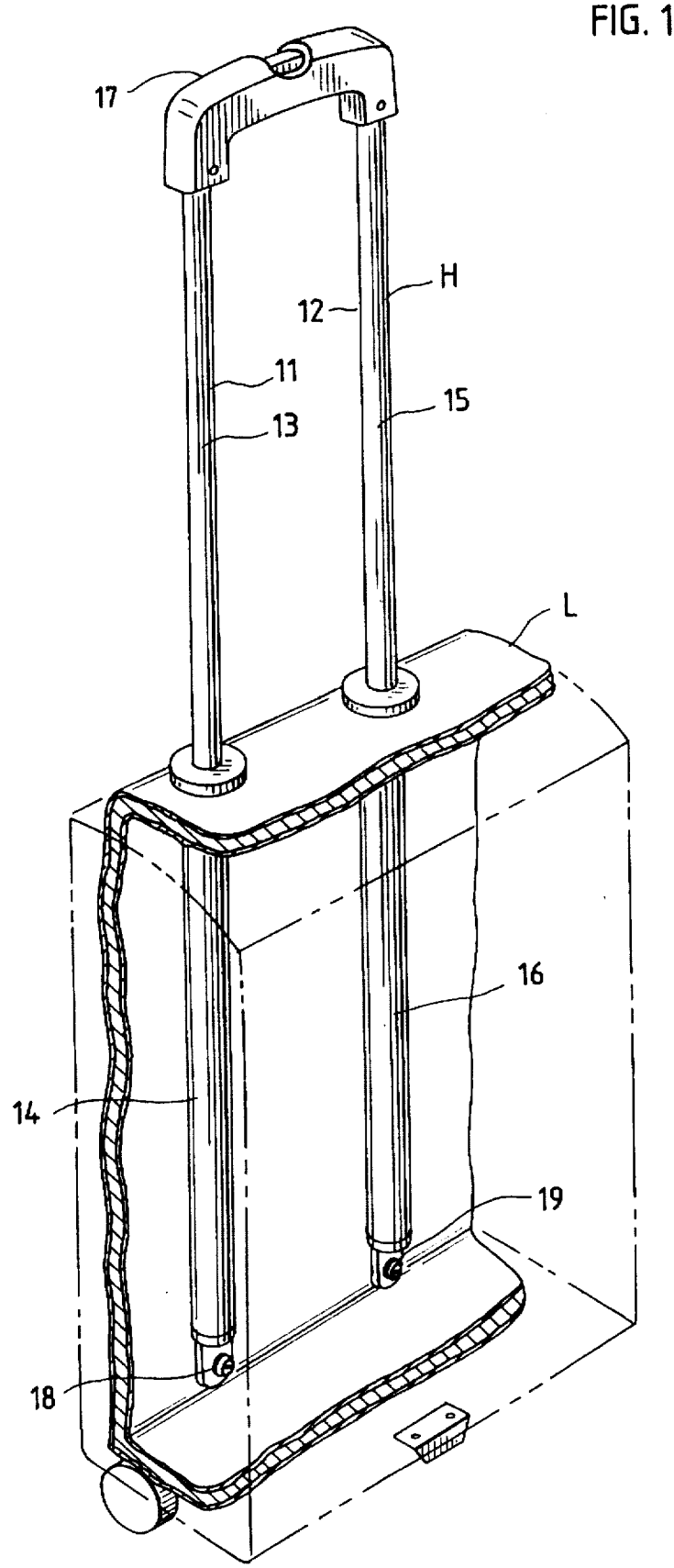
FIG. 1 is a perspective view of the handle assembly of the present invention secured to a piece of wheeled luggage with a portion of the luggage cut away to show the portion of the assembly disposed within the luggage.
Figure 8:
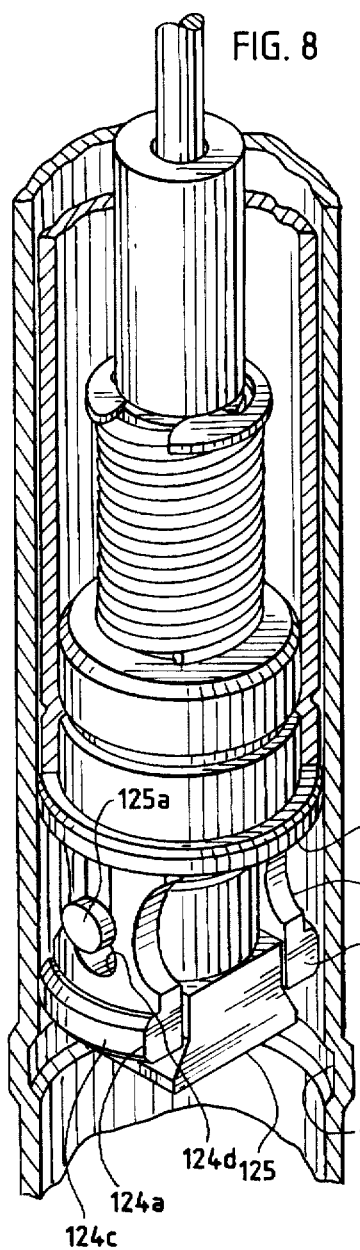
FIG. 8 is a perspective view of modified latching and plunger members.

Turning now to the drawings, FIG. 1 shows the handle assembly H of the present invention secured to a piece of wheeled luggage L. The luggage L may be any one of a wide variety of commercially available products. In addition, although the handle assembly of the present invention finds particular utility in wheeled luggage, it may also serve as a handle assembly in two-wheeled carts, cases or other similar devices.

The handle assembly H includes a pair of telescoping tube assemblies 11 and 12 disposed in parallel relation and secured to the bottom of the luggage L as shown in FIG. 1 and at the top of the luggage as shown in FIGS. 1–4. The assembly 11 includes a first tube 13 and a second tube 14. The assembly 12 includes a third tube 15 and a fourth tube 16. The lower tubes 14 and 16 are round tubes; and they have the same length and the same inside and outside diameter. They receive the upper tubes 13 and 15 which are also round and which have an outside diameter smaller than the inside diameter of the tubes 14 and 16. The tubes 13 and 15 have the same length, inside diameter, and outside diameter.

The tubes are made of stainless steel, aluminum, plastic or any other suitable material of high strength and rigidity. Although the embodiment shown includes round elongate tubes 13-16, an alternative embodiment may incorporate tubes having one of a wide variety of other cross-sectional configurations. One alternative may include tubes with a rectangular cross-section.

A handle member 17 made out of hard plastic or any other material of high strength and rigidity lies fixedly secured to the top ends of the tubes 13 and 15. Tabs 18 and 19 lie fixedly secured to the bottom end portions of the tubes 14 and 16, respectively, and to the luggage L. The tabs 18 and 19, the handle member 17, and a grommet and plate arrangement 20 maintain a parallel relation between the assemblies 11 and 12.

The handle 17 is a yoke-like member (see FIGS. 1–4) with sleeve portions 17a and 17b which receive the upper end portions of the tube 13 and 15, respectively. This handle 17 defines a cavity 17c which communicates with bores that extend through the sleeves 17a and 17b. The cavity 17c also contains a connecting or bridging member described in the text below.

The tube assembly 11 contains a locking assembly 21 (see FIGS. 2 and 4) for locking the first tube 13 and the second tube 14 in predetermined positions, e.g. in an extended and a retracted position. Similarly, the tube assembly 12 contains a locking assembly 22 for locking the third tube 15 and the fourth tube 16 in the same predetermined positions. The locking assemblies 21 and 22 have the same elements; and they operate in the same manner to lock the tube assemblies 11 and 12 in an extended and a retracted position. A bridging member 23 (including a button 23a) which lies in the cavity 17c connects the assemblies 21 and 22 and allows an operator to activate the two assemblies 21 and 22 at the same time.

Although the embodiment shown includes two locking assemblies 21 and 22, the handle assembly of the present invention may include only one locking assembly disposed in one of the two tube assemblies 11 and 12. In this modification, a push button secured to the top of the locking assembly may replace the bridging member 23 disposed in the cavity 17c of the handle 17.

Each of the assemblies 21 and 22 generally includes a latching member 24, a plunger member 25, and a spring 26. The latching member 24 lies secured (e.g. crimped into place as at 27) to the distal end of either tube 13 or 15. This member 24 defines a central bore 24a; and it includes a displaceable end portion 24b (including a protrusion 24c) which the plunger member 25 drives into locking engagement in annular grooves 14a and 14b of the tube 14 or in annular grooves 16a and 16b of the tube 16. The end portion 24b flares outwardly in a bell-like configuration to allow easy engagement by the plunger.

The plunger member 25 includes a lower portion 28 which extends through the central opening 24a of the latching member 24 for reciprocating movement through the opening. The distal end of this lower portion 28 is a chamfered flange 28a which drives the displaceable portion 24b of the latching member 24 into the annular grooves of the tube 14 or 16. The plunger member 25 also includes a rod 29 secured (e.g., threadably) to the lower portion 28 at one end and to the bridging member 23 at its other, opposite end.

The spring 26 lies between one (top) end of the latching member 24 and a stop 30 of the plunger 25. (The stop 30 is a ring which lies fixedly secured (e.g. by a press fit) around the low portion 28 of the plunger 25.) The spring 26 biases the plunger 25 upwardly, towards the handle 17, to the position shown in FIG. 4. In this position, the flange 28a as well as the bridging member 23 lies in raised positions where the flange locks the displaceable portion 24b of the latching member 24 against either the tube 14 or the tube 16.

The spring 26, the rod 29, and the stop 30 are made of metal or any other material or sufficient strength, while the lower portion 28 of the plunger 25 and the latching member 24 are made of plastic or other suitable materials. The latching member 24 is a flexible material which allows repeated flexing by the plunger 25 yet resists abrasion and has sufficient strength to lock the tubes of the two tube assemblies. This latching member 24 may be made of acetal, nylon, or other similar material.

As stated above, in the locked position shown in FIG. 4 and 5, the flanges 28a of the plungers 25 drive the portions 24b into the lower grooves (14a and 16a) of the tubes 14. When an operator presses the bridging member 23 inwardly of the handle 17 through an opening 31 at the top of the handle, the bridging member 23 transmits the force provided to the rods 29. If the force has sufficient magnitude to overcome the springs 26, the flanges 28a of the plungers 25 move to the position shown in FIG. 6. The operator may then move the tubes 13 and 15 outwardly of the tubes 14 and 16. After the portions 24b have moved out of the grooves 14a and 16a, the operator may release the bridging member 23 and then continue to pull the handle 17. When the portions 24b reach the upper grooves 14b and 16b, the springs 26 will drive the flanges 28a in the position shown in FIG. 5, jolting the assembly into a locked position. (The jolt indicates that the assembly has assumed a locked position.)

To prevent the tubes 13 and 15 from moving out of the tubes 14 and 16, respectively, each one of the tubes 14 and 16 has a stop portion which extends inwardly of the tube. Each stop portion lies at the top end of a tube; and it cooperates with a corresponding stop portion at the bottom end of the tubes 13 or 15. The stop portions of the tubes 13 and 15 (see FIG. 7) extend outwardly of these tubes.

The handle assembly H also includes a spring and pad assembly 32 at the bottom of the tube 14 and a spring and pad assembly 33 at the bottom of the tube 16. The assemblies bias the tubes 13 and 15 outwardly or upwardly when they reach the lowermost position shown in FIG. 4. Each assembly includes a base 34 fixed at the bottom of the tube in which it lies, a spring 35 and a floating pad 36.

Figure 9:
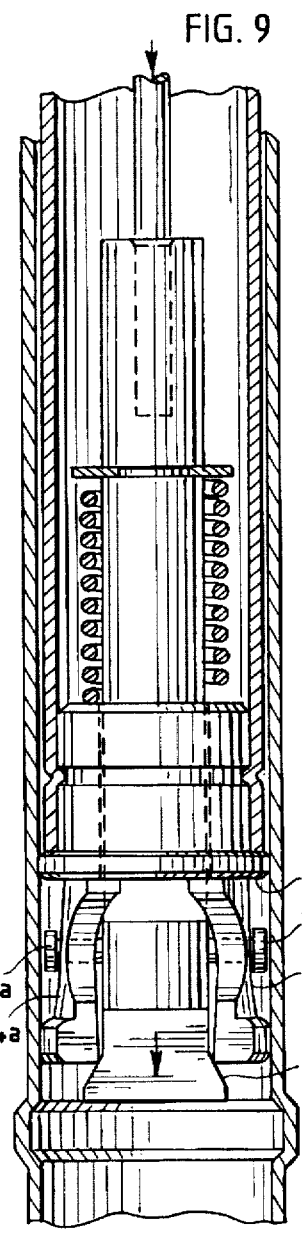
FIG. 9 is a sectional view, showing the latching member in a retracted position.
Figure 10:
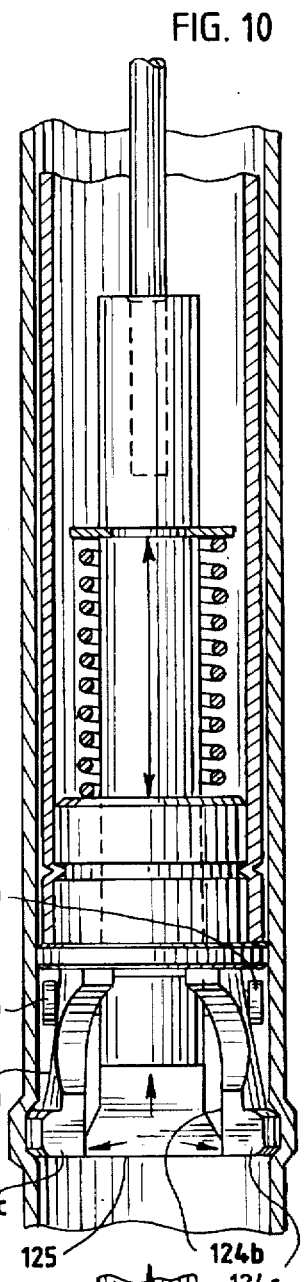
FIG. 10 is the sectional view of FIG. 9, showing the latching member in a locking position.
Figure 11:
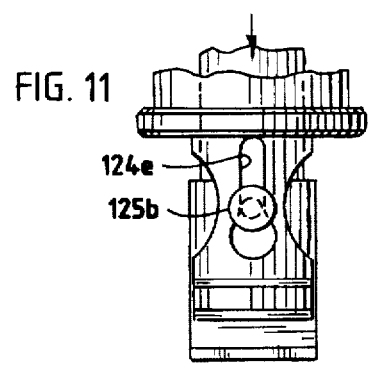
FIG. 11 is a partial side elevation view of the latching and plunger members of FIG. 9.
Figure 12:
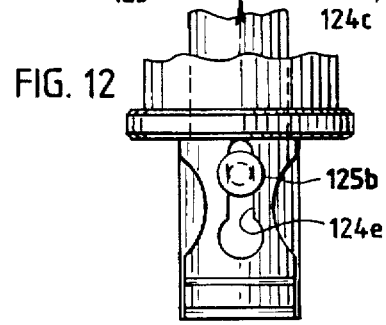
FIG. 12 is a partial side elevation view of the latching and plunger members of FIG. 10.

FIGS. 8–12 show a modification of the latching and plunger members. In this modification the latching member 124 includes two fingers or distal end portions 124a and 124b instead of the continuous bell-like end portion shown in FIGS. 4–6. The fingers 124a and 124b lie on opposite sides of a plunger member 125; and they flare outwardly of the plunger member 125 and the tube 13 or the tube 15. They include a protrusion 124c which the plunger member drives into annular grooves 14a and 14b of the tube 14 (as shown in FIG. 10) or in annular grooves 16a and 16b of the tube 16.

The fingers 124a and 124b define an elongate slot 124d and 124e, respectively. A stop 125a secured to the plunger member 125 extends through the slot 124d and engages the portions of the finger 124a adjacent the slot 124d to pull the finger 124a back to the retracted (unlocked) position shown in FIG. 9. Similarly, a stop 125b secured to the plunger member 125 (opposite the stop 125a) extends through the slot 124e and engages the portions of the finger 124b adjacent the slot 124e to pull the finger 125b back to the retracted (unlocked) position shown in FIG. 9.

The stops 125a and 125b assure the retraction of the flexible fingers 124a and 124b back to the position shown in FIG. 9 from the position shown in FIG. 10. They have a predetermined length that allows their head portions to cooperate with the sloping sides of the fingers 124a and 124b in a camming action. The stops 125a and 125b are bolt-like members (e.g., screws) made out of steel or any other suitable material of high strength and rigidity; and they include a plate-like head portion that engages the sides of a corresponding finger and an elongate stem portion. These stops 125a and 125b may also be integrally formed parts of the plunger member 125.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. For example, openings cut into the tubes 14 and 16 may replace the grooves 14a and 14b and the grooves 16a and 16b. Therefore, by the appended claims, the applicant intends to cover any modifications and other embodiments as incorporate those features which constitute the essential features of this invention.

What is claimed is:

1. A handle assembly for wheeled carts or luggage, said assembly comprising: first and second tubes, the first tube extending into the second tube in telescoping relation with the second tube; and locking means secured to the first tube for locking the first tube in a predetermined position relative to the second tube; said locking means including a latching member and a plunger member for displacing the latching member laterally of the first and second tubes between locking and releasing positions; said second tube including receiving means for cooperating with the latching member to lock one tube relative to the other; said plunger member including stop means for displacing the latching member from the locking position to the releasing position.

2. The assembly of claim 1, wherein the latching member includes two finger portions and the plunger member extends between those finger portions.

3. The assembly of claim 2, wherein the latching member is flexible and lies fixedly secured to the distal end of the first tube.

4. The assembly of claim 1, wherein the receiving means includes at least one groove in the second tube.

5. The assembly of claim 1, wherein the plunger member extends through the center of the first tube and a spring biases the plunger member against the latching member.

6. The assembly of claim 5, wherein the spring lies disposed around the plunger member between the latching member and a stop portion of the plunger member.

7. A handle assembly for wheeled carts or luggage, said assembly comprising:
   (a) a first tube assembly including first and second tubes, the first, inner tube extending into the second tube in telescoping relation with the second, outer tube;
   (b) a second tube assembly including third and fourth tubes, the third, inner tube extending into the fourth tube in telescoping relation with the fourth, outer tube;
   (c) said first and second tube assemblies disposed in substantially parallel relation;
   (d) each tube assembly including locking means secured to the inner tube of the assembly for locking the inner tube in a predetermined position relative to the outer tube;
   (e) each said locking means including a latching member and a plunger member for displacing the latching member laterally of the inner and outer tubes of the tube assembly that the locking means locks between locking and releasing positions;
   (f) each of said outer tubes including receiving means for cooperating with a latching member to lock the outer tube relative to the inner tube that the outer tube receives;
   (g) each plunger member including stop means for displacing the corresponding latching member from the locking position to the releasing position.

8. The assembly of claim 7, wherein each latching member of a locking means includes two finger portions and the plunger member of the locking means extends between those finger portions.

9. The assembly of claim 8, wherein each latching member is flexible and lies fixedly secured to the distal end of an inner tube.

10. The assembly of claim 7, wherein the receiving means includes at least one groove in an outer tube.

11. The assembly of claim 10, wherein the receiving means includes a groove at each end portion of an outer tube.

12. The assembly of claim 7, wherein each plunger member extends through the center of a corresponding inner tube and a spring disposed around the plunger biases the plunger member against the corresponding latching member.

13. The assembly of claim 7, further comprising a handle member disposed between the first and second tube assemblies and secured to end portions of the first and third tubes, said handle member including actuating means for driving the plunger member of each tube assembly.

14. The assembly of claim 7, wherein the tubes are round, elongate members.

15. The assembly of claim 7, further comprising a securing means disposed between the first and second tube assemblies for maintaining the two tube assemblies in substantially parallel relation.

* * * * *